Dec. 11, 1956            V. GEORGE            2,773,696

SMALL TRAILERS FOR CARRYING THE FRONT END OF A TRACTOR

Filed Sept. 21, 1953            2 Sheets-Sheet 1

INVENTOR.
Vaullee George
BY Chas. Denegre
Attorney.

Dec. 11, 1956             V. GEORGE             2,773,696
SMALL TRAILERS FOR CARRYING THE FRONT END OF A TRACTOR
Filed Sept. 21, 1953             2 Sheets-Sheet 2
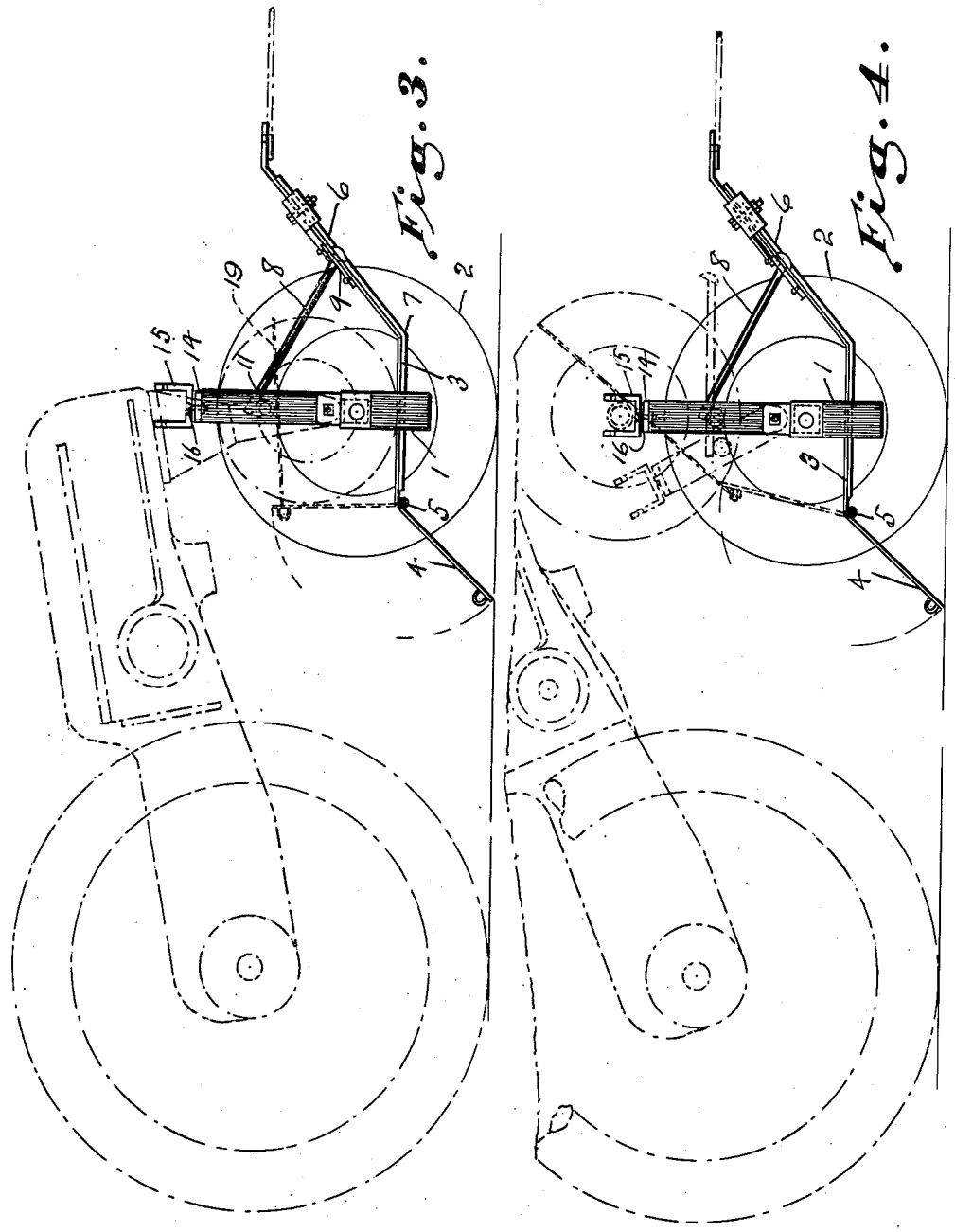
INVENTOR.
Vaullee George
BY Chas. Denegre
Attorney.

United States Patent Office 2,773,696
Patented Dec. 11, 1956

2,773,696
SMALL TRAILERS FOR CARRYING THE FRONT END OF A TRACTOR

Vaullee George, Birmingham, Ala.

Application September 21, 1953, Serial No. 381,273

1 Claim. (Cl. 280—47.15)

This invention relates to a special type of small trailer. It has for its main object to provide such a trailer that will save cost and labor in moving farm tractors and the like from place to place when necessary. It often becomes necessary to move a large size tractor on a farm, or from one farm to another, such a movement being slow and expensive. The present small trailer will provide means for quickly moving a large tractor from one place to another and at less cost.

Further objects are to provide a small trailer that will be highly satisfactory for the purpose intended, simple in structure, comparatively cheap to manufacture, easy to use and keep in order, and extremely durable.

Other objects and advantages will appear from the drawings and description.

Figure 1:
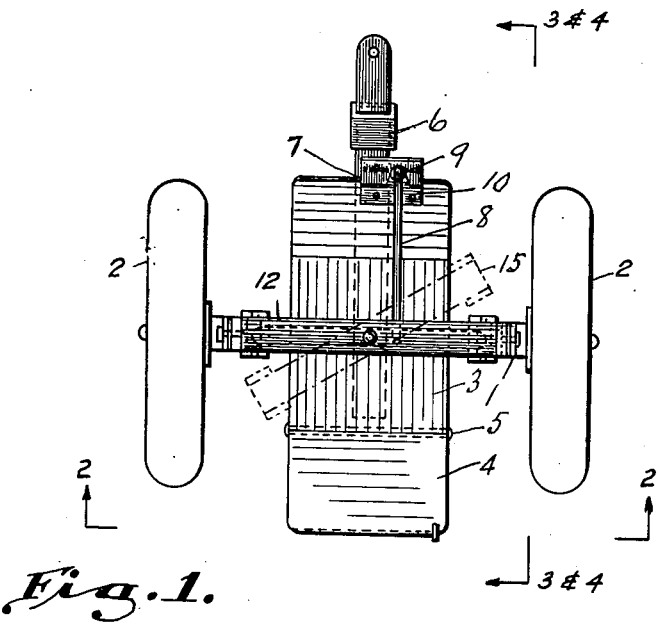
Figure 2:
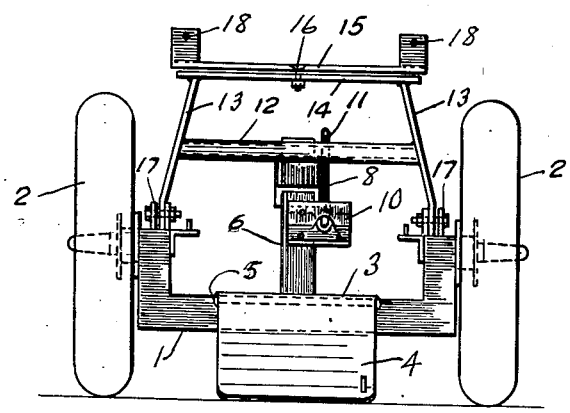

By referring generally to the drawings, a part of this application, it will be observed that Fig. 1 is a plan view of a small trailer made according to the present invention; Fig. 2 is a rear elevational view on line 2—2 of Fig. 1; Fig. 3 is a side elevational view on line 3—3 of Fig. 1 showing a tractor in broken lines with its front end mounted upon the low position of the small trailer; and Fig. 4 is a side elevational view on line 4—4 of Fig. 1 showing a tractor in broken lines with its front end mounted upon the high position of the small trailer.

Similar reference numerals refer to similar parts throughout the several views.

Referring to the drawings in detail it will be seen that the trailer comprises an axle 1 having two wheels 2, a platform 3 supported on the axle with a swingable ramp 4 connected to the rear of the platform at 5. A draw bar assembly 6 is connected to the front of the platform 7 with link bar 8 having one end 9 connected to a plate 10 on the draw bar assembly with its other end 11 attached to an elevated supporting assembly consisting of a cross bar 12, side bars 13, and top bar 14. A cradle bar 15 is mounted on a pivot bolt 16 in the top bar 14. The side bars 13 are pivotally attached by bolt assemblies 17 to the top of the axle 1.

To move a tractor of one type the front wheels of same are placed upon the platform as indicated by broken lines in Fig. 3. Or a tractor may have its front axle placed in the cradle bar 15 as shown by broken lines in Fig. 4. Ordinary chains 19 looped over the front axle of the tractor and suitable bolts are used to hold the tractor front wheels on the trailer while it is being towed along by an automobile or truck. If desired bolts may be inserted through holes near the top ends in the cradle bar to hold a front axle of a tractor in the cradle bar. Also gravity will tend to hold the front of the tractor in place for towing.

The trailer may be made of any material suitable for the purpose. Also it may be made in different sizes and capacities depending on how and where to be used.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A small trailer of the class described comprising a pair of wheels, a wide U-shaped axle mounted between and attached to said wheels, a platform attached upon the low portion of said axle, a ramp pivotally attached to the rear edge of said platform; a wide A-shaped bracket assembly attached by its lower ends by bolts and nuts to the upper portions of said axle adjacent the wheels, a cradle-type bar attached by its center to a pivot bolt in the center of the top portion of said wide A-type bracket assembly; chain and bolt means adapted for holding said ramp in its perpendicular position and said A-type bracket assembly in a slanting position.

References Cited in the file of this patent

UNITED STATES PATENTS

| | | |
|---|---|---|
| 1,241,418 | Mosher | Sept. 25, 1917 |
| 2,058,691 | Holsten et al. | Oct. 27, 1936 |
| 2,436,485 | Roxy | Feb. 24, 1948 |
| 2,451,119 | Regan | Oct. 12, 1948 |
| 2,541,582 | Hawkins | Feb. 13, 1951 |
| 2,639,926 | Parks | May 26, 1953 |
| 2,661,856 | Stanley et al. | Dec. 8, 1953 |